United States Patent Office 3,447,441
Patented June 3, 1969

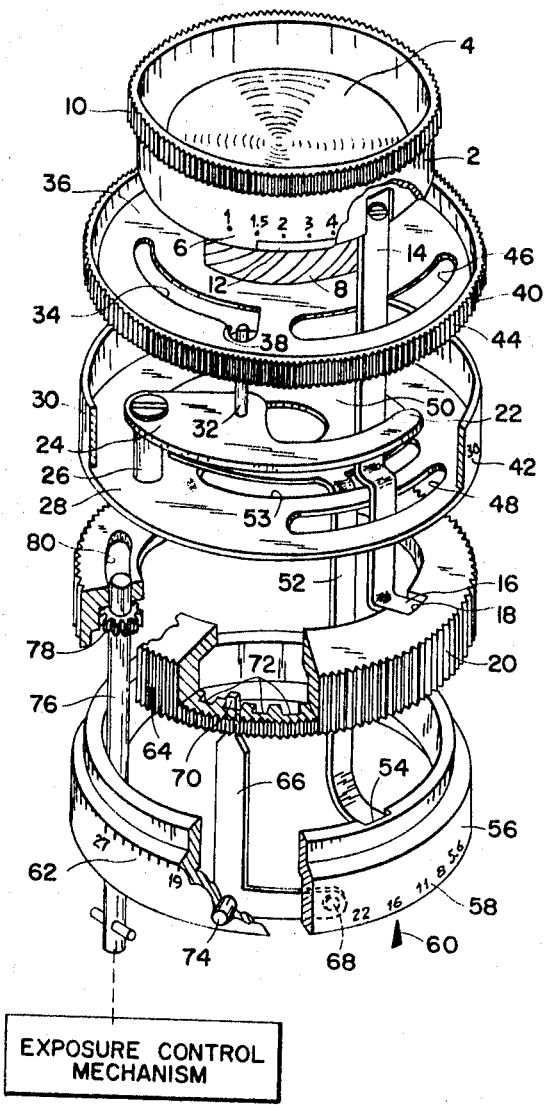

3,447,441
OBJECTIVE FOR A PHOTOGRAPHIC CAMERA
Wolfgang Ort, Stuttgart-Bad Cannstatt, Germany, assignor to Eastman Kodak Company, Rochester, N.Y., a corporation of New Jersey
Filed Mar. 28, 1967, Ser. No. 626,512
Claims priority, application Germany, Apr. 6, 1966, K 58,940
Int. Cl. G03b 3/02
U.S. Cl. 95—44  6 Claims

ABSTRACT OF THE DISCLOSURE

An objective for a photographic camera in which the focus setting member and diaphragm aperture and film speed setting member are interconnected when the exposure time setting member is set for flash exposure. When the film speed value is changed during a flash exposure time setting of the objective, the distance setting changes automatically but the diaphragm aperture remains the same. Thereafter the distance and diaphragm aperture bear a fixed relation to one another for any setting of the two. When the exposure time setting member is set for daylight exposures, the focus setting member and diaphragm aperture and film speed setting member are disconnected, and the film speed setting may be changed without affecting either the diaphragm aperture or the distance setting. Changing the film speed setting adjusts a light responsive exposure control mechanism so that it will thereafter in response to the light select the desired diaphragm aperture. The distance setting must be selected manually.

BRIEF SUMMARY OF THE INVENTION

This invention relates generally to photographic cameras, and more specifically to an improved objective for a photographic camera.

Objectives for photographic cameras having diaphragm aperture, exposure time, film speed and focus or distance setting members which may be coupled to one another are well known in the art. However, in such objectives, the setting members and related mechanism are of complicated construction and are difficult to operate. Furthermore, in such objectives it is often very difficult to change or vary the film speed setting without altering or requiring the alteration of many of the other setting members. Applicant's invention is directed to an improved objective in which an adjustment can be readily made for film speed for both flash and daylight operation.

SUMMARY OF THE INVENTION

This invention includes within its scope an improved objective for a photographic camera in which a film speed setting may be readily made while the objective is set for either a flash or daylight mode of operation. For flash exposures, the focus setting member and diaphragm aperture and film speed setting member are interconnected, and as the film speed adjustment is made, the focus setting member is automatically moved to adjust to the proper distance while the diaphragm aperture remains the same. Thereafter the distance and diaphragm aperture bear a fixed relation to one another for any setting of the two. For daylight operation, the focus setting member and diaphragm aperture and film speed setting member are disconnected, and as the film speed adjustment is made neither of the members is moved. Once the film speed adjustment is completed, the diaphragm aperture is automatically set by a light sensitive exposure control mechanism. The operator must manually set the focusing member for the desired distance.

One of the objects of the present invention is to provide an improved objective for a photographic camera that is of simple design and construction, thoroughly reliable and efficient in operation, and economical to manufacture.

Another object of the invention is to provide an improved objective for a photographic camera in which the film speed adjustment may be made in a rapid and facile manner in both the flash and daylight modes of operation of the camera.

BRIEF DESCRIPTION OF THE DRAWINGS

Objects and advantages other than those set forth above will be apparent from the following description when read in connection with the accompanying drawing, in which an exploded, perspective view of an objective constructed in accordance with a preferred embodiment of the invention is shown.

DETAILED DESCRIPTION

Referring to the drawing, this invention is shown in connection with an objective for a photographic camera, not shown. The objective has an annular focus setting member 2 at one end supporting a lens 4, and further has a distance scale 6 on its periphery. The focus setting member 2 has a threaded portion 8 in threaded engagement with a fixed complementary portion of the shutter, not shown, and is rotatably movable by a ribbed rim 10 to adjust focus setting member 2 to a proper distance setting by aligning a selected distance with an index mark, not shown, on a fixed part of the shutter, not shown. The focusing range scale 12 for flash exposures is also placed on focus setting member 2 adjacent distance scale 6, and is preferably of a different color. A leaf spring 14 has one end secured to focus setting member 2, and further has a bent tab 16 at its other end biased by the inherent resiliency of spring 14 into a notch 18 in an annular diaphragm aperture and film speed setting member 20. The movement of the bent tab 16 into and out of notch 18 in diaphragm aperture setting member 20 is controlled by a finger 22 on a lever 24 pivotally movable about a bolt 26 secured to a circular plate 28 of a shutter housing 30. Movement of lever 24 is controlled by a pin 32 mounted thereon extending through a concentric slot 34 in an annular, dishlike exposure time setting member 36. The lever 24 and pin 32 are biased by a spring, not shown, in a clockwise direction causing pin 32 to engage the outer edge of slot 34 and to ride thereon. With pin 32 in a notch 38 at one end of slot 34 as shown in the drawings, the finger 22 releases leaf spring 14 causing tab 16 thereof to enter notch 18 in diaphragm aperture and film speed setting member 20. The exposure time setting member 36 has an index mark 40, cooperable with an exposure time scale 42 on the shutter housing. When the exposure time setting member 36 is moved in a counterclockwise direction by a ribbed rim 44, pin 32 and lever 24 are moved into a counterclockwise direction causing finger 22 to engage spring 14 and withdraw its tab 16 from notch 18 in diaphragm aperture and film speed setting member 20. The exposure time setting member 36 and shutter plate 28 are both provided with concentric slots 46, 48 respectively, through which leaf spring 14 extends and is movable therealong upon rotatable movement of focus setting member 2. A diaphragm mechanism 50 of known type is supported by shutter plate 28, and has a lug 52 extending through a concentric slot 53 in shutter plate 28. The lug 52 has a bent end engaging recess 54 along the inner periphery of an annular scale carrier member 56. The carrier member has a diaphragm scale 58 on its outer periphery cooperating with a fixed mark 60 on the shutter or camera housing, not shown, and a film speed scale 62 cooperable with an index mark 64 on the periphery of diaphragm aperture and film speed setting member 20. The outer periphery of the diaphragm aperture and film speed setting member 20 is ribbed to facilitate rotatable movement thereof by the operator. The diaphragm aperture and film speed setting member 20 and scale carried member 56 are releasably secured to one another by an L-shaped spring 66 having one end secured to carrier member 56 at 68, and a tongue 70 at its opposite end spring urged into one of a plurality of grooves 72 along the inner periphery of diaphragm aperture and film speed setting member 20. When tongue 70 seats in a groove 72, the diaphragm aperture and film speed setting member 20 and carrier member 56 are releasably locked together. The spring 66 has a pin 74 extending through an opening in carrier member 56 which when manually depressed by the operator withdraws tongue 70 from the groove 72 in which it is seated for disconnecting the diaphragm aperture and film speed setting member 20 from carrier member 56. A shaft 76 journaled for rotation in a fixed support member such as the camera housing, not shown, has a pinion 78 at one end in threaded engagement with a complementary internal thread along the inner periphery of the diaphragm aperture and film speed setting member 20. The upper end of shaft 76 extends through a concentric slot 80 in the diaphragm aperture and film speed setting member 20, and the opposite end of shaft 76 is connected to a light responsive exposure control mechanism of known type.

In the operation of this invention, let us assume initially that the operator desires to take flash exposures. The exposure time setting member 36 is then moved by the operator in a clockwise direction to an exposure time which is suitable for flash exposures, such as 1/30 of a second, for example. This could be accomplished as indicated earlier by moving index mark 40 on rim 44 of the exposure time setting member 36 along exposure scale 42 on the shutter housing 30. In any event, when the exposure time setting member 36 is moved to the exposure time for flash exposure, pin 32 is moved into recess 38 causing finger 22 of lever 24 to release leaf spring 14. One or both of the focus setting member 2 and diaphragm aperture and film speed setting member 20 is initially moved until tab 16 drops into notch 18 interconnecting the two members 2, 20. Before the exposures are taken, the operator must set the objective for the proper film speed and to accomplish this, he depresses pin 74 disconnecting the diaphragm aperture and film speed setting member 20 from scale carrier member 56. The operator then manually moves the diaphragm aperture and film speed setting member 20 until index mark 64 thereon is in register with the proper film speed number on film speed scale 62. During such movement, the focusing member 2 which is secured to the diaphragm aperture and film speed setting member 20 by spring 14 is automatically moved to the proper distance setting or focused position for the desired film speed and diaphragm aperture. Accordingly, the diaphragm aperture and distance factors will be properly correlated for any selected combination of aperture and distance. Merely setting the proper distance on focusing member 2 will automatically provide the proper diaphragm aperture or vice versa in the flash exposure mode of operation at the desired time speed.

Now let us assume that the operator wishes to take daylight exposures. The exposure time setting member 36 is moved in a counterclockwise direction to a desired exposure time for daylight exposures which may be 1/125 of a second, for example. Such movement of exposure time setting member 36 pivots lever 24 in a counterclockwise direction causing finger 22 to withdraw tab end 16 of leaf spring 14 from diaphragm aperture and film speed setting member 20 for disconnecting focusing member 2 therefrom. Assuming that index mark 64 on the diaphragm aperture film speed setting member 20 is not in register with the proper film speed designation on the film speed scale 62, the operator must depress pin 74 disengaging the diaphragm aperture and film speed setting member 20 from scale carrier member 56 permitting the operator to move the diaphragm aperture and film speed setting member 20 until index mark 64 thereon is in register with the proper mark on film speed scale 62. During such movement, neither focusing member 2 nor the diaphragm mechanism 50 is moved. The camera exposure control mechanism will automatically move the diaphragm aperture and film speed setting member 20 to provide the proper diaphragm aperture for the particular light conditions involved. The operator has to manually move focusing member 2 to provide the proper distance setting for the exposure.

The invention has been described in detail with particular reference to one embodiment thereof, but it will be understood that variations and modifications can be accepted within the spirit and scope of the invention as described hereinabove, and as defined in the appended claims.

I claim:

1. An objective for a photographic camera, said objective comprising a focus setting member, a diaphragm aperture and film speed setting member, a carrier member for a diaphragm aperture scale and a film speed scale, and means movable between a first position for releasably connecting said diaphragm aperture and film speed setting member to said carrier member whereby movement of said diaphragm aperture and film speed member moves said carrier member and sets the diaphragm aperture, and a second position for disconnecting said diaphragm aperture and film speed setting member from said carrier member whereby movement of said diaphragm aperture and film speed member adjusts the film speed setting without affecting the diaphragm aperture setting.

2. The invention according to claim 1 wherein said connecting and disconnecting means comprises a detent means.

3. The invention according to claim 1 wherein said connecting and disconnecting means comprises a leaf spring having one end secured to said carrier member and its opposite end engageable in a notch in said diaphragm aperture and film speed member.

4. The invention according to claim 1 wherein said connecting and disconnecting means comprises a leaf spring having one end secured to said carrier member and its opposite end engageable in a notch in said diaphragm aperture and film speed member, said leaf spring further having a pin extending through a complementary opening in said carrier member for manual movement of said leaf spring between its first and second positions.

5. In an objective for a photographic camera having a focus setting member, an exposure time setting member, and a diaphragm aperture setting member, the combination comprising:
   means for releasably connecting said focus setting member to said diaphragm aperture setting member; and
   means controlled by said exposure time setting member for disconnecting said focus setting and diaphragm aperture setting members when said exposure time setting member is moved to an exposure time suitable for daylight exposures, and permitting the focus setting and diaphragm aperture setting members to be connected when said exposure time setting member is moved to a different exposure time suitable for flash exposures.

6. In an objective for a photographic camera having a focus setting member, an exposure time setting member, a diaphragm aperture and film speed setting member, and a carrier member for a diaphragm aperture scale and a film speed scale, the combination comprising:
   first means for releasably connecting said focus setting member to said diaphragm aperture and film speed setting member;

means controlled by said exposure time setting member for disconnecting said focus setting and diaphragm aperture and film speed setting members when said exposure time setting member is moved to an exposure time setting suitable for daylight exposures, and permitting the focus setting and diaphragm aperture and film speed setting members to be connected when said exposure time setting member is moved to a different exposure time suitable for flash exposures; and second means movable between a first position for releasably connecting said diaphragm aperture and film speed setting member to said carrier member, and a second position for disconnecting said diaphragm aperture and film speed setting member from said carrier member whereby the diaphragm aperture cannot be set upon movement of said diaphragm aperture and film speed setting member, said diaphragm aperture and film speed setting member being movable to adjust the film speed setting when said second means is moved to its second position, said movement of said diaphragm aperture and film speed setting member automatically moving said focusing member only when said exposure time setting member is in its position for flash exposures.

References Cited

UNITED STATES PATENTS

| | | | |
|---|---|---|---|
| 3,229,606 | 1/1966 | Gunther et al. | 95—45 X |
| 3,273,482 | 9/1966 | Starp | 95—11.5 X |
| 3,309,977 | 3/1967 | Sauer et al. | 95—45 |
| 3,344,723 | 10/1967 | Rentschler | 95—10 |
| 3,344,726 | 10/1967 | Weller | 95—64 |

NORTON ANSHER, *Primary Examiner.*

C. B. FUNK, *Assistant Examiner.*

U.S. Cl. X.R.

95—64